US010357924B2

(12) United States Patent
Waldrop, III et al.

(10) Patent No.: US 10,357,924 B2
(45) Date of Patent: Jul. 23, 2019

(54) COMPOSITE FEEDSTOCK STRIPS FOR ADDITIVE MANUFACTURING AND METHODS OF FORMING THEREOF

(71) Applicant: The Boeing Company, Chicago, IL (US)

(72) Inventors: John C. Waldrop, III, St. Peters, MO (US); Michael W. Hayes, Belleville, IL (US); Gregory James Schoepen Hickman, University City, MO (US)

(73) Assignee: The Boeing Company, Chicago, IL (US)

( * ) Notice: Subject to any disclaimer, the term of this patent is extended or adjusted under 35 U.S.C. 154(b) by 794 days.

(21) Appl. No.: 14/835,323

(22) Filed: Aug. 25, 2015

(65) Prior Publication Data

US 2017/0057165 A1   Mar. 2, 2017

(51) Int. Cl.
| | |
|---|---|
| *B29C 70/20* | (2006.01) |
| *B29C 70/50* | (2006.01) |
| *B29C 70/54* | (2006.01) |
| *B29K 71/00* | (2006.01) |
| *B29K 81/00* | (2006.01) |

(Continued)

(52) U.S. Cl.
CPC ............ *B29C 70/545* (2013.01); *B29C 70/20* (2013.01); *B29C 70/504* (2013.01); *B29C 64/106* (2017.08); *B29K 2071/00* (2013.01); *B29K 2081/06* (2013.01); *B29K 2105/106* (2013.01); *B29K 2105/253* (2013.01);

(Continued)

(58) Field of Classification Search
CPC ..... B29C 70/207; B29C 70/021; B29C 70/08; B29C 70/081; B29C 70/083; B29C 70/30; B33Y 70/00; B33Y 10/00
See application file for complete search history.

(56) References Cited

U.S. PATENT DOCUMENTS

| | | | |
|---|---|---|---|
| 8,372,231 B1 * | 2/2013 | Tsotsis | B29C 70/386 156/178 |
| 8,425,708 B2 | 4/2013 | Rubin et al. | |

(Continued)

OTHER PUBLICATIONS

Waldrop III, John C. , "Composite Feedstock Strips for Additive Manufacturing and Methods of Forming Thereof", U.S. Appl. No. 14/835,323, filed Aug. 25, 2015, 42 pgs.

(Continued)

*Primary Examiner* — Stella K Yi
(74) *Attorney, Agent, or Firm* — Kwan & Olynick LLP

(57) ABSTRACT

Provided are composite feedstock strips for additive manufacturing and methods of forming such strips. A strip may include continuous fibers extending parallel to the principal axis of the strip. The cross-sectional distribution of these continuous fibers may be uneven. Specifically, the fibers may be concentrated near the center of the strip and may be positioned away from at least some portions of the strip surface. A strip may be formed by laminating a layup of one or more fiber-containing plies and one or more resin plies. The position of the different types of plies in the layup is used to control distribution of the fibers and other materials within the strip. The laminated sheet is slit into multiple strips in a direction parallel to the continuous fibers. The cross-sectional profile of the slit strips may be later changed without disturbing orientation of the continuous fibers.

18 Claims, 12 Drawing Sheets

(51) Int. Cl.
 *B29L 31/30* (2006.01)
 *B33Y 10/00* (2015.01)
 *B33Y 70/00* (2015.01)
 *B29C 64/106* (2017.01)
 *B29K 105/00* (2006.01)
 *B29K 105/10* (2006.01)

(52) U.S. Cl.
 CPC ....... *B29L 2031/3076* (2013.01); *B33Y 10/00* (2014.12); *B33Y 70/00* (2014.12)

(56) References Cited

U.S. PATENT DOCUMENTS

| | | | |
|---|---|---|---|
| 2007/0175572 A1* | 8/2007 | Rubin | B29C 70/525 156/196 |
| 2010/0189963 A1 | 7/2010 | Nair et al. | |
| 2011/0064908 A1* | 3/2011 | Kweder | B29B 11/16 428/113 |
| 2013/0164498 A1 | 6/2013 | Langone et al. | |
| 2014/0328964 A1 | 11/2014 | Mark et al. | |
| 2017/0057181 A1 | 3/2017 | Waldrop, III et al. | |

OTHER PUBLICATIONS

"European Application Serial No. 16183315.7, Search Report dated Feb. 24, 2017", 6 pgs.

Waldrop III, John C. et al., "System and Method for Cutting Material in COntinuous Fiber Reinforced Additive Manufacturing", U.S. Appl. No. 14/948,057, filed Nov. 20, 2015, 80 pgs.

"U.S. Appl. No. 15/051,285, Examiner Interview Summary dated Aug. 24, 2018", 4 pages.

"U.S. Appl. No. 15/051,285, Non Final Office Action dated Jul. 20, 2018", 8 pages.

"U.S. Appl. No. 15/051,285, Restriction Requirement dated May 1, 2018", 10 pages.

\* cited by examiner

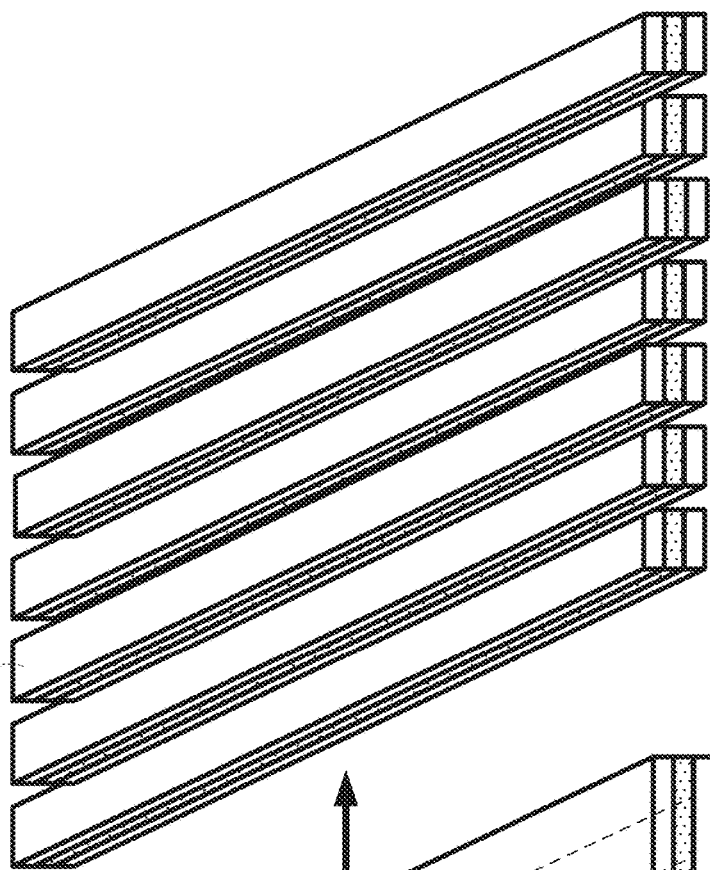
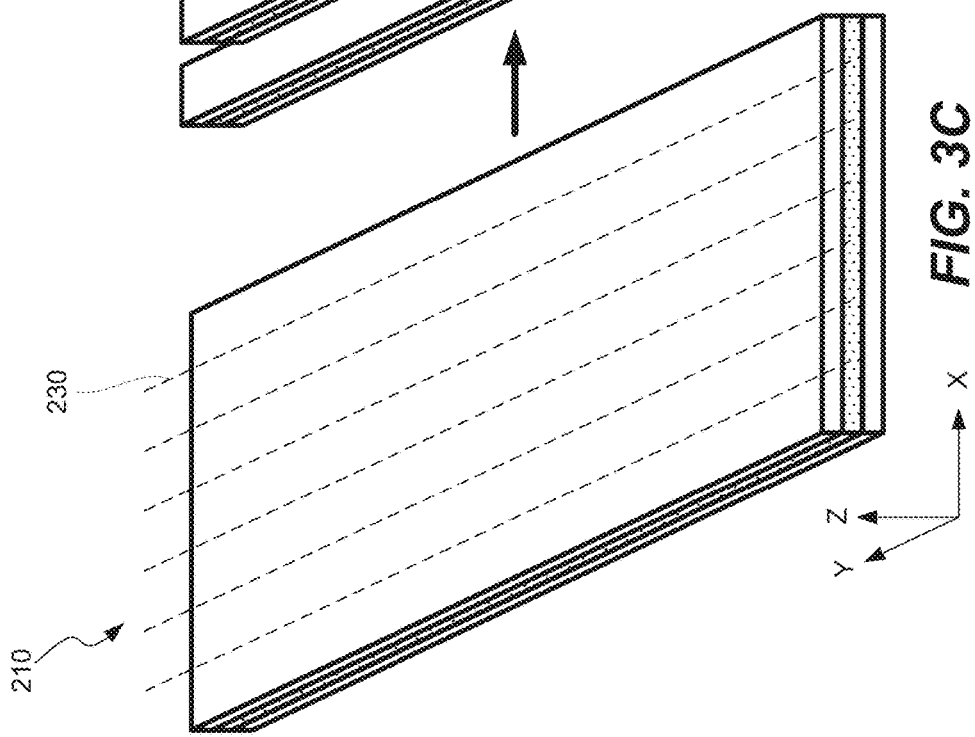

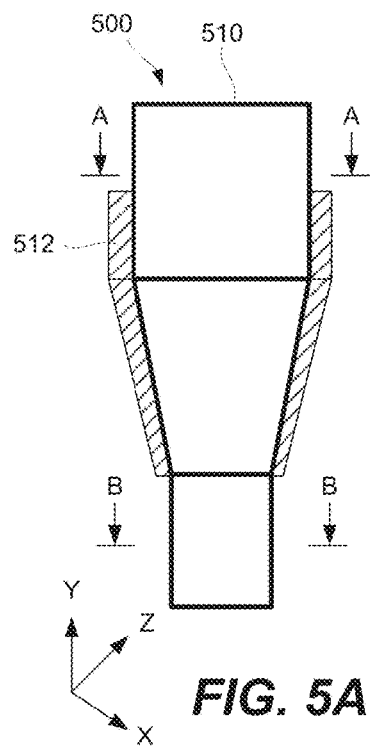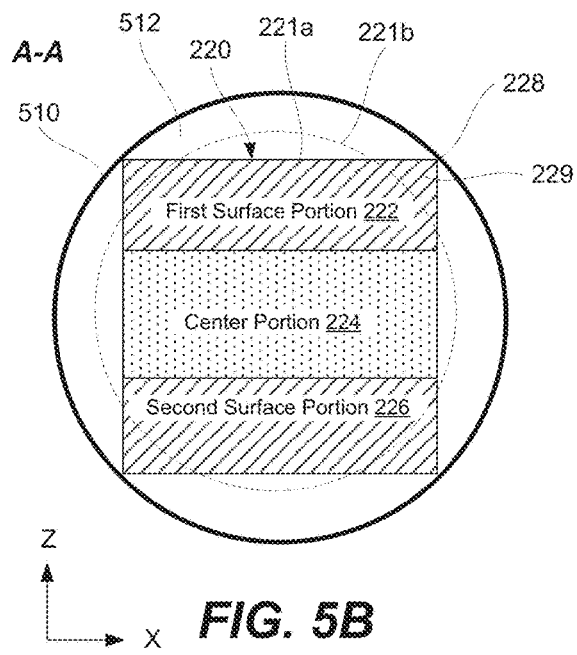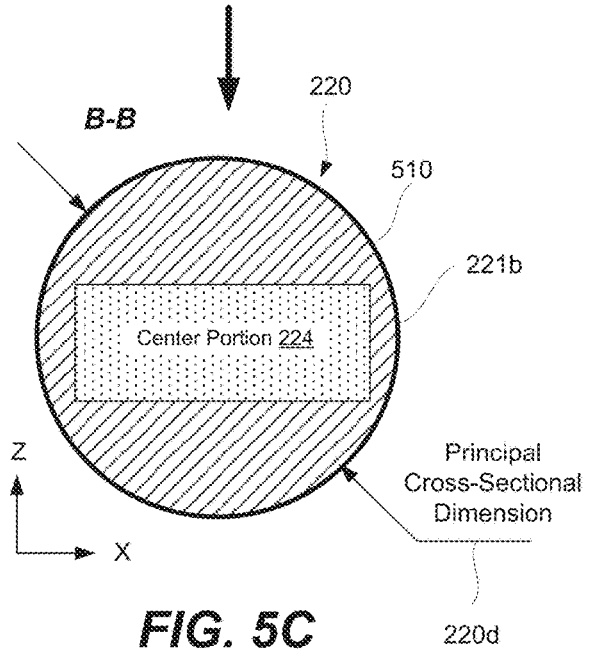
FIG. 5A
FIG. 5B
FIG. 5C

US 10,357,924 B2

COMPOSITE FEEDSTOCK STRIPS FOR ADDITIVE MANUFACTURING AND METHODS OF FORMING THEREOF

BACKGROUND

Additive manufacturing is a process of forming a three-dimensional (3D) object adding layers of material, such as plastic and metal. The process often relies on computer systems and, more specifically, on computer aided design (CAD) to design each layer and the overall layup process. Additive manufacturing is particularly attractive for complex low volume parts that are frequently used in, for example, aerospace applications. Stereo lithography (SLA), selective laser sintering (SLS) and fused deposition modeling (FDM) are currently three primary methods used to make additively manufactured components. Typically neat resins, which are materials without any structural supports (e.g., fibers), are used for this purpose. Incorporating structural supports proved to be difficult and generally limited to small particles and short fibers. However, these types of structural supports do not yield mechanical properties associated with continuous fibers. Furthermore, current techniques used for fabricating feedstock, such as extrusion, may cause voids and other defects in the feed stock. Finally, these feedstock fabricating techniques are prone to clogging with structural supports.

SUMMARY

Provided are composite feedstock strips for additive manufacturing and methods of forming such strips. A composite feedstock strip may include continuous unidirectional fibers. Specifically, the fibers may extend parallel to each other and to the principal axis of the strip extending along the length. The continuity aspects results in superior mechanical properties, such as the tensile strength along the principal axis. Furthermore, the cross-sectional distribution of fibers may be uneven in the composite feedstock strip. The fibers may be concentrated near the center of the strip and, in some embodiments, may be positioned away from at least some portions of the strip surface. Some surface portions of the strip may be substantially free from fibers. This fiber distribution allows changing the cross-sectional profile of strips without disturbing the unidirectional and continuous nature of the fibers. This option of changing the cross-sectional profile may be attractive for additive manufacturing. Furthermore, a combination of the unidirectional fiber orientation aspect and the central fiber concentration aspect results in composite feedstock strips that are more flexible in all directions normal to the principal axis.

A composite feedstock strip may be formed by laminating a layup of one or more fiber-containing plies and one or more of resin plies. The number, thickness, and relative position of these plies in the layup is used to control distribution of the fibers and other materials within the resulting composite feedstock strip, which is formed by slitting the laminated sheet. The slitting is performed in the direction parallel to the fibers, which are unidirectional, to preserve continuity of the fibers. As noted above, the cross-sectional profile of the slit strips may be later changed, for example, into a round profile, without disturbing orientation of the fibers. The laminated sheet thickness (corresponding to the strip thickness) and the slit width (corresponding to the strip width) may be controlled to yield desirable dimensions of composite feedstock strips.

In some embodiments, a method of forming composite feedstock strips for additive manufacturing comprises forming a layup. The layup may comprise one or more fiber containing plies and one or more of resin plies. In some embodiments, the layup may comprise multiple fiber containing plies and/or multiple resin plies. The arrangement of these plies in the layup controls, at least in part, the cross-sectional distribution of different materials, such as fibers, within the resulting composite feedstock strips.

In some embodiments, all fibers in all of the one or more fiber containing sheets forming the layup are parallel to each other. For example, all fibers may extend along the length of the layup. This may be referred to a unidirectional orientation of fibers, which is achieved by using the one or more fiber containing sheets each having a unidirectional orientation of fibers and aligning these one or more fiber containing sheets in a particular manner to ensure the unidirectional nature in the layup as a whole.

The method may proceed with laminating the layup thereby forming a laminated sheet. The laminated sheet is then slit into the composite feedstock strips. Slitting is performed along the direction parallel to all of the fibers with the laminated sheet. As such, slitting does not disturb the continuity of the fibers.

In some embodiments, a volumetric fraction of the fibers within the laminated sheet varies throughout a thickness of the laminated sheet. The variability of the volumetric fraction of the fibers within the laminated sheet may be attributed to the arrangement of one or more fiber containing plies and one or more of resin plies in the layup and composition of each ply. Furthermore, this volumetric fraction variability is carried to composite feedstock strips and may assist when changing the cross-sectional profile of the composite feedstock strips in later operations.

In some embodiments, the volumetric fraction of the fibers within the laminated sheet is greater at a center of the laminated sheet (the center defined in the direction of the thickness) than at one of the laminated sheet surfaces. More specifically, the volumetric fraction of the fibers may be greater at the center than both surfaces. In some embodiments, the volumetric fraction profile is symmetric with respect to the center of the laminated sheet.

In some embodiments, a portion of the laminated sheet forming one of the surfaces of the laminated sheet is free from fibers. A ratio of the thickness of this fiber-free portion to the total thickness of the laminated sheet may be between about 5% and 45% or, more specifically, between about between about 20% and 30%. This fiber-free portion allows changing the cross-sectional profile of the composite feedstock strips without disturbing the fibers. In some embodiments, portions forming both surfaces of the laminated sheet are free from fibers.

In some embodiments, the average volumetric fraction of the entire laminated sheet is between about 1% and 60% on average or, more specifically, between about 10% and 50% or even between about 20% and 40%.

The cross-sectional profile of each composite feedstock strip may be a square or, more generally, a rectangle, at least after slitting. Alternatively, the cross-sectional profile of each of the composite feedstock strips may be a circle or, more generally, an oval. This type of cross-sectional profiles may be achieved by changing the square or rectangular cross-sectional profile by, for example, heating the composite feedstock strips and redistributing some material of the composite feedstock strips.

In some embodiments, all fibers in each composite feedstock strip are parallel to the primary axis of that composite feedstock strip. The composite feedstock strips may be bendable with respect to the primary axis. The fibers may have an average length of at least 100 feet in the composite feedstock strips. The composite feedstock strips may have a principal cross-sectional dimension of less than about 0.060 inches or, more specifically, less than 0.050 inches or even less than 0.040 inches.

In some embodiments, the method further comprises changing the cross-sectional profile of each composite feedstock strip. This operation may be also referred to as a reforming operation. For example, the cross-sectional profile may be changed to a circle. The original cross-sectional profile, after slitting and prior to this changing operation, may be a square or, more generally, a rectangle. This reforming operation may comprise heating each composite feedstock strip and redistributing the material away from corners of the cross-sectional profile. For example, the material redistributed away from the corners is free from fibers. In some embodiments, the position of the fibers within each of the composite feedstock strips is retained while redistributing material away from the corners. Furthermore, while changing the cross-sectional profile, a portion of each composite feedstock strips comprising fibers may have a lower temperature than the material redistributed away from the corners, which is free from fibers. The changing operation may be performed using a liquefier.

In some embodiments, at least one outer ply of the layup is one of the one or more resin plies. More specifically, both outer plies of the layup are two of the one or more resin plies. The one or more resin plies may be free from the fibers. In some embodiments, the one or more resin plies comprise one or more materials selected from the group consisting of polyethersulfone (PES), polyphenylsulfone (PPS), polyetheretherketone (PEEK), polyetherketoneketone (PEKK), polyetherimide (PEI), and thermoplastic polyimide (TPI). More specifically, the one or more resin plies comprise polyethersulfone (PES).

In some embodiments, the one or more fiber containing plies comprise one or more materials selected from the group consisting of polyethersulfone (PES), polyphenylsulfone (PPS), polyetheretherketone (PEEK), polyetherketoneketone (PEKK), polyetherimide (PEI), and thermoplastic polyimide (TPI). More specifically, the one or more fiber containing plies comprise polyetherketoneketone (PEKK).

In some embodiments, forming layup and laminating is performed in a roll-to-roll process using a double belt process or a continuous compression machine for consolidation. Slitting the laminated sheet into the composite feedstock strips may be performed using one of waterjet slitting, rotational cutting, pressure wheel slitting, or roll slitting. Furthermore, slitting the laminated sheet into the composite feedstock strips may be performed in line with laminating. Slitting produces multiple strips simultaneously. In some embodiments, the method further comprises performing additive manufacturing using the composite feedstock strips.

Also provided is a composite feedstock strip for additive manufacturing. The composite feedstock strip comprises a resin and fibers disposed within resin. The fibers may be parallel to each other and extend along the primary axis of the composite feedstock strip. The volumetric fraction of the fibers may vary along at least one direction perpendicular to the primary axis. More specifically, the volumetric fraction of the fibers may vary along two directions perpendicular to the primary axis. In some embodiments, the volumetric fraction of the fibers within the composite feedstock strip is greater at the center of the composite feedstock strip based on the cross-section than at some portions of the surface of the composite feedstock strip. The volumetric fraction of the fibers within the laminated sheet is between about 1% and 60% on average.

In some embodiments, the composite feedstock strip is free from voids. The fibers may be continuous along the length of the composite feedstock strip. All fibers may be parallel to the primary axis. In some embodiments, the cross-sectional profile of the composite feedstock strip is a square or a circle. The resin may comprise one or more materials selected from the group consisting of polyethersulfone (PES), polyphenylsulfone (PPS), polyetheretherketone (PEEK), polyetherketoneketone (PEKK), polyetherimide (PEI), and thermoplastic polyimide (TPI).

These and other embodiments are described further below with reference to the figures.

BRIEF DESCRIPTION OF THE DRAWINGS

FIG. 3C is a schematic perspective representation of the laminated sheet shown in FIG. 3A illustrating slitting directions, in accordance with some embodiments.

FIG. 4A is a schematic perspective representation of composite feedstock strips formed from the laminated sheet shown in FIG. 3C, in accordance with some embodiments.

FIG. 5A is a schematic representation of a liquefier used for changing the cross-sectional profile of composite feedstock strips, in accordance with some embodiments.

FIG. 5B is a schematic cross-sectional representation of a composite feedstock strip entering the liquefier shown in FIG. 5A, in accordance with some embodiments.

FIG. 5C is a schematic cross-sectional representation of the composite feedstock strip leaving the liquefier shown in FIG. 5A, in accordance with some embodiments.

DETAILED DESCRIPTION

Figure 1:
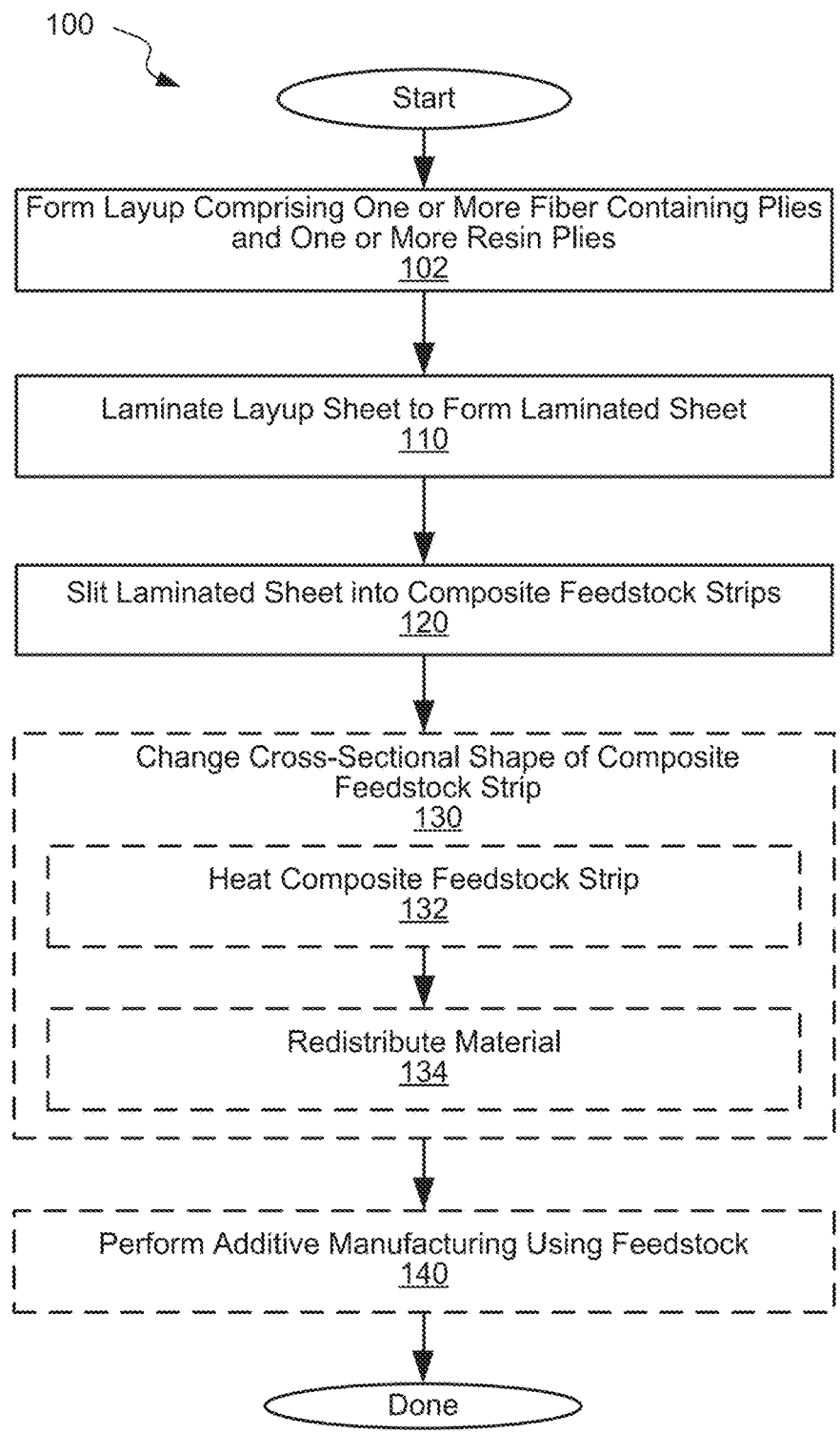
FIG. 1 is a process flowchart corresponding to a method of forming composite feedstock strips for additive manufacturing, in accordance with some embodiments.

In the following description, numerous specific details are set forth to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Many applications, such as aerospace, require parts with complex geometries yet low production volumes. While many techniques suitable for high production volumes, such as molding, have been developed overtime, these techniques are cost prohibitive and often do not produce parts with needed characteristics. Additive manufacturing has recently gained a lot of popularity in attempts to fill this void. However, many structural requirements (e.g., strength of fabricated components) cannot be easily achieved with current additive manufacturing techniques. For example, incorporating structural supports, such as fibers or particles, into additive manufacturing feedstock has been a major challenge. Even small fibers and particles tend to clog extruding nozzles when attempting to directly form feedstock with small cross-sectional profiles. Yet, small profiles are essential for fabricating parts with complex geometries, tight dimensional tolerances, and/or smooth surface finish.

One area of particular interest for composite materials in general and for composite parts formed using additive manufacturing in particular is using continuous fibers. Continuous fibers provide high strengths levels in the direction of the fiber. For example, a composite feedstock strip formed from a polyaryletherketone (PAEK) resin and filled with 30% by volume of chopped carbon fibers may have a tensile modulus of about 3 million pounds per square inch (MSI). At the same time, a composite feedstock strip formed from the same resin and filled with 35% by volume of continuous carbon fibers may have a tensile modulus of greater than 10 MSI. Furthermore, composite parts produced using continuous fiber feedstock are expected to have roughly six times the strength and ten times the stiffness of comparable unreinforced parts currently produced.

However, incorporating continuous fibers into additive manufacturing is even more challenging than incorporating short fibers and particles. Current additive manufacturing techniques are not simply capable of producing composite feedstock strip with continuous fibers at commercial scales. Handling of continuous fibers, maintaining continuity, and preserving orientations of fibers have proven to be major obstacles for conventional additive manufacturing techniques.

Described herein are composite feedstock strips for additive manufacturing and methods of forming such strips. These composite feedstock strips include continuous unidirectional fibers. More specifically, the fibers extend parallel to each other and to the principal axes of the strip. These feedstock strips may be produced from high grade composite plies and films without introducing voids or other types of defects.

A composite feedstock strip is formed by laminating a layup of one or more fiber-containing plies and one or more of resin plies. The position of these plies in the layup is used to control distribution of the fibers and other materials within the resulting strip. Furthermore, the orientation of all fiber-containing plies in the layup is such that all fibers in this layup are unidirectional. After lamination, the laminated sheet is slit into multiple composite feedstock strips. The slitting is performed along the direction parallel to the fibers in these strips. As such, the continuity of the fibers is preserved. The proposed methods of forming composite feedstock strips are low cost, applicable to a wide range of resin materials (e.g., thermoplastic materials) and fiber materials, and can be easily tuned to produce different amounts and/or distribution of fibers within the feedstock strips. The feedstock can be used for fused deposition modeling (FDM) additive manufacturing technologies to produced composite parts. Composite feedstock strips include continuous unidirectional fibers and may be also referred to as reinforced feedstock strips or, more specifically, continuous fiber reinforced feedstock strips or rods.

Any planar plies may be used to form a layup, including but not limited to specialty plies, such aerospace grade fiber-containing plies, and the like. Furthermore, different layup arrangements may be used to achieve different distribution of fibers and other materials within resulting feedstock strips thereby opening doors for new and unique configurations of composite feedstock strips. Furthermore, this wide range of material options and arrangement options allow economical processing with minimal fiber disruption or buckling as well as continuous equipment runtime. Various continuous processing techniques, such as roll-to-roll processing, may be used for individual operations or a combination of multiple operations, such as a combination of forming a layup and laminating the layup as further described below.

A layup may be formed from continuous rolls of plies. One of these rolls may include a fiber-containing ply. The fibers in this ply may be continuous and extend in the direction of roll windings. In some embodiments, multiple rolls of the same or different fiber-containing plies may be used to form the same layup. Other plies may be resin plies, which may be free from fibers. A method may be a continuous process in which rolls containing one or more fiber-containing plies and one or more resin containing plies unwind, and the plies are continuously fed into processing equipment (e.g., a laminator) for consolidating all plies of the layup into a laminated sheet. In some embodiments, a slitter may also be a part of this continuous process. The slitter cuts the laminated sheet into individual composite feedstock strips, which could be formed into rolls for compact storage and shipping. This continuous process may also include a liquefier, which changes the cross-sectional profile of the composite feedstock strips. For example, the strips may have the square profile after slitting and then the circular profile after passing through the liquefier. Finally, additive manufacturing may also be a part of the continuous process.

During the additive manufacturing, the composite feedstock strips are used to form composite parts, usually parts with complex geometrical shapes. This continuous processing is generally faster and more controlled (e.g., better fiber orientation control) than conventional discrete processing, especially when some operations are performed by hand. One having ordinary skills in the art would understand that not all processing operations described above need to be performed. For example, composite feedstock strips may be used without changing their cross-sectional profiles. In some embodiments, the strips may be laid down and consolidated into a part using thermoplastic composite placement technique. Furthermore, additive manufacturing may be a part of a different process altogether. Finally, grouping of these processing operations may differ and may not necessarily be a part of one large group. For example, layup formation and lamination may be a part of one group. A roll of the laminated sheet may be formed after completing all operations in this group. This roll may be then slit into composite feedstock strips during a slitting operation belonging to another group. Yet another processing group may include cross-sectional profile changing operations.

Overall, provided composite feedstock strips have low cost and high quality and may be formed from a wide range of composite materials, in a wide range of configurations, as well as a wide range of cross-sectional sizes and profiles. These feedstock strips can be produced in large volumes to supply the needs of a continuous fiber reinforced additive manufacturing market. Comparable feedstock made directly using thermoplastic composite pultrusion processes have not been able to efficiently produce small diameter rod material particularly in the higher performance thermoplastic materials suitable for high end applications.

Examples of Composite Feedstock Strips and Forming Thereof

FIG. 1 is a process flowchart corresponding to method 100 of forming composite feedstock strips for additive manufacturing, in accordance with some embodiments. Method 100 may commence with forming a layup during operation 102 followed by laminating the layup during operation 110. A laminated sheet is formed during operation 110 and later slit into composite feedstock strips during operation 120. In some embodiments, the cross-sectional shape of the composite feedstock strips is changed during optional operation 130. This operation 130 may involve heating the composite feedstock strips during optional operation 132 and/or redistributing material during optional operation 134. Redistributing the material may be performed without impacting relative orientations of fibers in the composite feedstock strips. In some embodiments, method 100 may involve performing additive manufacturing during optional operation 140. The composite feedstock strips may be consumed during this operation to form a composite part. Each of these operations will now be described in more detail with reference to FIG. 2A-FIG. 8 illustrating components at various stages of method 100, equipment used to perform the described operations, and test samples.

Referring to operation 102, which involves forming a layup, the layup formed during this operation may include one or more fiber containing plies and one or more of resin plies. As further described below, the one or more of resin plies may not include fibers. Even if fibers are included in the one or more of resin plies, these fibers are different from the one or more fiber containing plies, which include continuous unidirectional fibers.

Figure 2A:
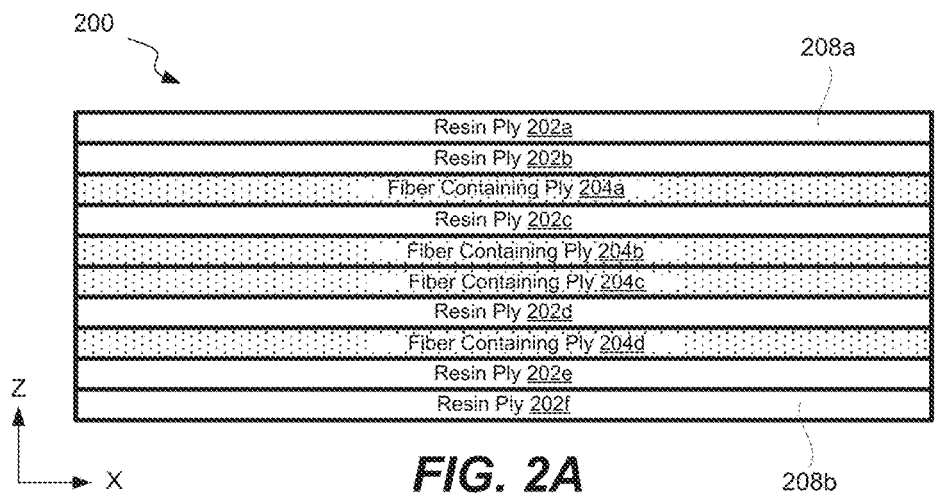
FIG. 2A is a schematic cross-sectional representation of a layup including multiple resin plies and fiber containing plies, in accordance with some embodiments.

Referring to FIG. 2A illustrating one example of layup 200, this particular layup includes four fiber containing plies 204a-204d and six resin plies 202a-202f. The number, thickness, and arrangement of fiber containing plies 204 and resin plies 202 may be used to control, at least in part, the cross-sectional distribution of materials within laminated sheet 210 (formed by laminating layup 200). This material may be maintained, at least to some extent, in composite feedstock strips 220, which are formed by slitting laminated sheet 210 as further described below. Furthermore, the number and the thickness of plies 202 and 204 may be used to control thickness 210a of laminated sheet 210, which in turn controls the cross-sectional dimension of composite feedstock strips 220.

Resin plies 202 used to form layup 200 may be free from fibers. All continuous unidirectional fibers may be provided in fiber containing plies 204. In some embodiments, resin plies 202 may include other types of fillers, such as particles and/or short multidirectional fibers. Referring to FIG. 2A, in some embodiments, at least one outer ply 208a of layup 200 is resin ply 202. More specifically, both outer plies 208a and 208b may be resin plies 202. All other plies of layup 200, including fiber containing plies 204 and, in some embodiments, other resin plies 202, are disposed between outer plies 208a and 208b. In some embodiments, multiple outer plies on each side of layup 200 are resin plies 202. The example presented in FIG. 2A illustrates two resin plies 202a and 202b on one side of layup 200 and two resin plies 202e and 202f on the other side of layup 200. This type of arrangement may be used to ensure that sufficiently thick surface portions of layup 200 and then of laminated sheet 210 and eventually of composite feedstock strips 200 are free from fibers to allow changing cross-sectional shapes of composite feedstock strips 200.

In some embodiments, resin plies 202 comprise one or more materials selected from the group consisting of polyethersulfone (PES), polyphenylsulfone (PPS), polyetheretherketone (PEEK), polyetherketoneketone (PEKK), polyetherimide (PEI), and thermoplastic polyimide (TPI). More specifically, one or more resin plies 202 comprise polyethersulfone (PES). All resin plies 202 forming the same layup 202 may have the same composition. Alternatively, different resin plies 202 forming the same layup may have different compositions.

In some embodiments, fiber containing plies 204 comprise one or more materials selected from the group consisting of polyethersulfone (PES), polyphenylsulfone (PPS), polyetheretherketone (PEEK), polyetherketoneketone (PEKK), polyetherimide (PEI), and thermoplastic polyimide (TPI). These materials may be referred to matrix resins and should be distinguished from the resin of resin plies 202. More specifically, fiber containing plies 204 may comprise polyetherketoneketone (PEKK), The resin used in fiber containing plies 204 may be the same or different than the resin used in resin plies 202. For example, resin plies 202 may comprise polyethersulfone (PES), while fiber containing plies 204 may comprise polyetherketoneketone (PEKK). In some embodiments, resin plies 202 may include polyethylene terephthalate (PET), while fiber containing plies 204 may comprise polyethersulfone (PES).

One or more resins used in fiber containing plies 204 and in resin plies 202 may be thermoplastic resins. In some embodiments, one or more resins used in fiber containing plies 204 and in resin plies 202 may include a thermoset resin. The thermoset resin, if used, may be combined with one or more thermoplastic resins (e.g., used as a filler). Furthermore, when the thermoset resin is used, fiber containing plies 204 and/or resin plies 202 containing this resin may be heated, for example, above the glass transition temperature of that thermoset resin.

The thickness of each resin ply 202 may be between about 0.001 inches and 0.020 inches or, more specifically, between 0.002 inches and 0.010 inches. The thickness of each fiber containing ply 204 may be between about 0.003 inches and 0.015 inches or, more specifically, between 0.005 inches and 0.010 inches.

Figure 2B:
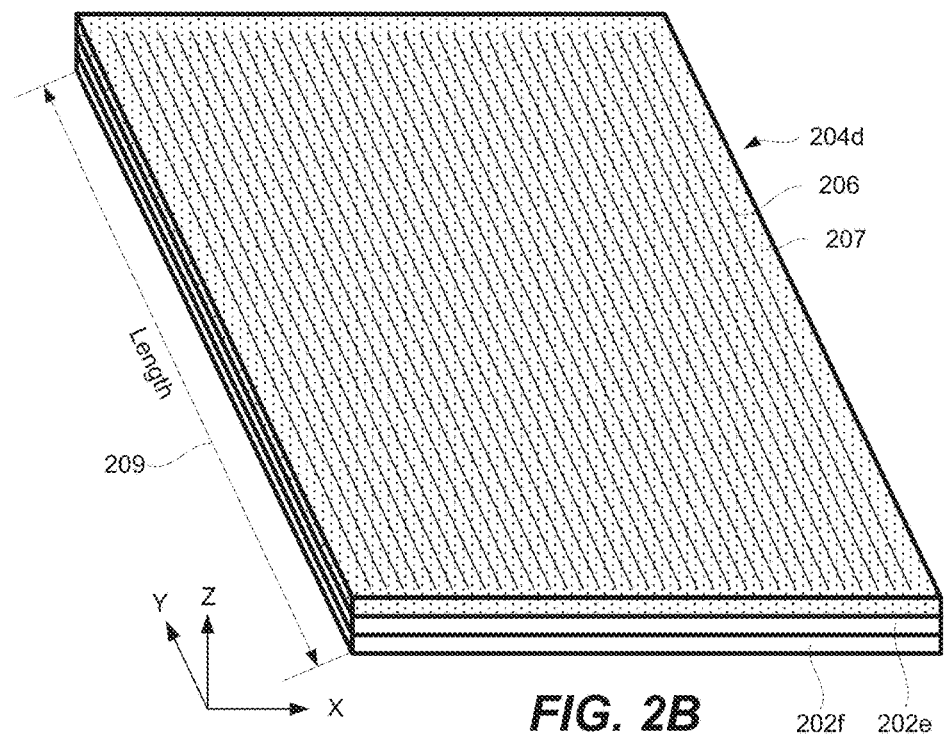
FIG. 2B is a schematic perspective representation of a portion of the layup shown in FIG. 2A illustrating orientations of fibers in one of the fiber containing plies, in accordance with some embodiments.

Referring to FIG. 2B, continuous fibers 206 of fiber containing plies 204 may be any suitable fibrous components, such as glass (S-type or E-type), quartz, aramid, carbon fibers, carbon nanotubes, or combinations thereof. Substantially all (e.g., more than 90%) fibers 206 within each fiber containing ply 204 are continuous and oriented in a unidirectional arrangement as, for example, shown in FIG. 2B illustrating fibers 206 extending along the Y axis. The unidirectional arrangement may be also referred to as 0/0 arrangement. Specifically, all fibers 206 in all fiber containing plies 204 forming layup 200 are parallel to each other. One having ordinary skills in the art would understand that the term parallel allows for some tolerance such as less than about ±5° or even less than about ±2°.

Other types of fiber orientations (not unidirectional) may interfere with subsequent slitting of laminated sheet 210 but may nonetheless be applicable for forming composite feedstock strips 220 in accordance with the methods described herein. One of ordinary skill in the art would recognize that the type, cross-sectional dimensional, amount of fibers 206 within fiber containing plies 204, as well as the type of the matrix resin utilized in fiber containing plies 204 and the resin used in resin plies 202 may vary, based on numerous factors, including cost and the ultimate desired physical and mechanical properties of composite feedstock strips 220.

In some embodiments, all fiber containing plies 204 forming layup may be initially provided in rolls, e.g., prepreg tapes. Fibers 206 in these fiber containing plies 204 may extend along the winding direction of these rolls. When multiple fiber containing plies 204 are used all plies are precisely oriented with respect to each other in layup 200 to ensure that all fibers 206 in layup 200 are parallel to each other (unidirectional).

Figure 7:
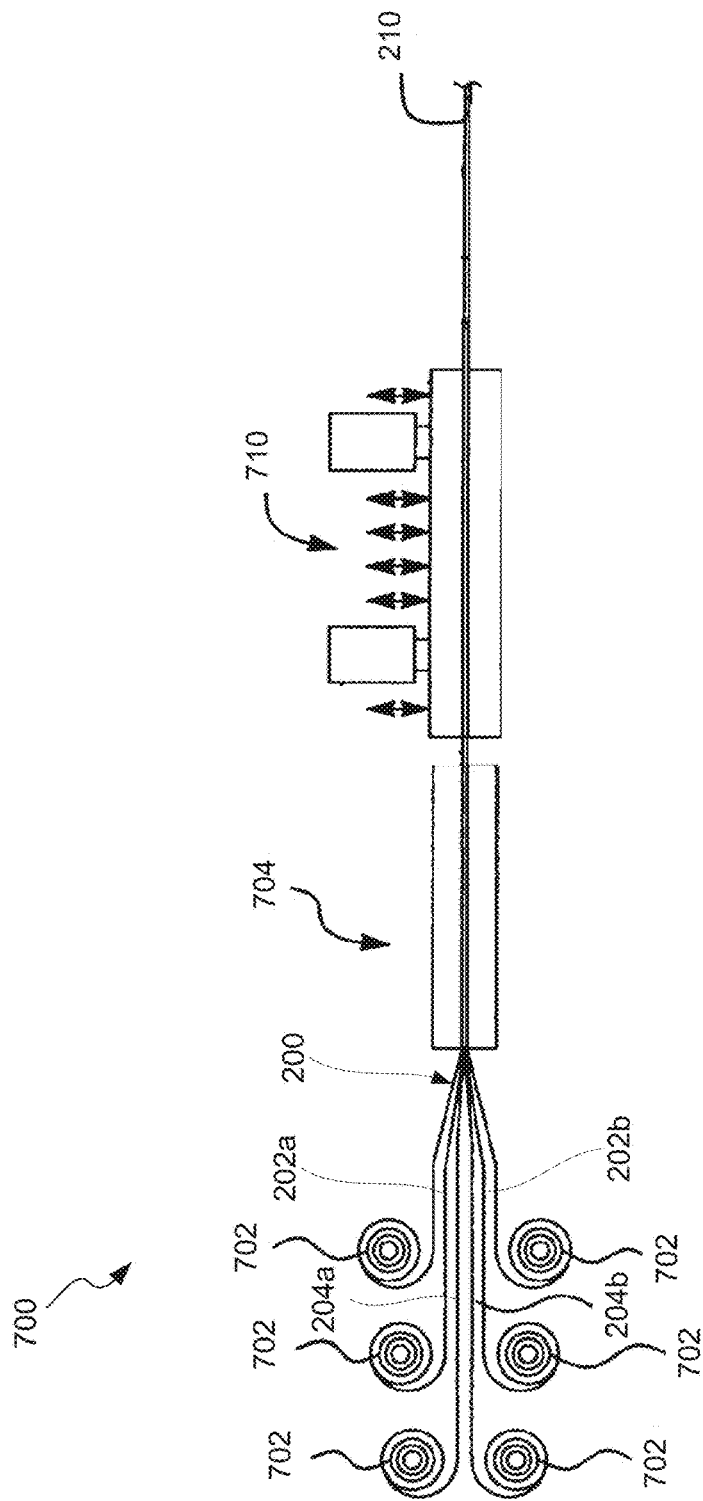
FIG. 7 is a schematic representation of an apparatus used for forming a laminated sheet, in accordance with some embodiments.

In some embodiments, forming layup 200 is performed in a roll-to-roll process. Referring to FIG. 7, fiber containing plies 204a and 204b and resin plies 202a and 202b may be unrolled from respective rolls 702 and form layup 200 upon entering preheating zone 704. These continuous sheet forming processes, as with roll-to-roll handling, can be performed in a double belt press or continuously compressed in molding machines.

Returning to FIG. 1, after completing operation 102, method 100 continues with laminating layup 200 during operation 110. During this operation, laminated sheet 210 is formed. Specifically, the material of all resin sheets 202 and all fiber containing sheets 204 may be consolidated during this operation. At the same time, the unidirectional orientation of fibers 206 may be preserved. Fibers 206 may move closer to each other during this operation or otherwise change their orientation within the cross-section. For example, when multiple fiber containing plies 204 are used to form layup, fibers 206 in one of these fiber containing plies 204 may move closed to fibers in another one of these fiber containing plies 204. In some embodiments, the orientation of fibers 206 provided in each of fiber containing plies 204 may remain substantially the same. For example, fiber containing plies 204 may be previously consolidated. Alternatively, one layup 200 is formed, relative orientation of fibers 206 may remain the same during lamination operation 110.

Continuing with FIG. 1 and operation 110, this laminating operation 110 may involve heating and compressing layup 200. In some embodiments, operation 110 may be performed in a continuous manner (e.g., in a roll-to-roll manner) using, for example, apparatus 700 shown in FIG. 7. Specifically, apparatus 700 may include preheating zone 704 for preheating layup to a lamination temperature. One having ordinary skills in the art would understand that the lamination temperature may depend on the resins used in fiber containing plies 204 and resin plies 202, thickness of these plies, and other process parameters. In general, the lower temperature limit should be sufficient to ensure melt consolidation of different plies forming layup 200 and to a certain extent flow of materials (other than fibers 206) forming layup. On the other hand, the upper temperature limit may need to be controlled to maintain orientation of fibers 206 during consolidation of the plies into laminate sheet 210 and to prevent thermal degradation.

During operation 110, heated layup 200 may be fed from preheating zone 704 into lamination zone 710, which may be also referred to as a consolidation zone. In lamination zone, layup 200 is consolidated to form single integrated laminate sheet 210. As layup 200 moves forward through lamination zone 710, it may be continuously heated at least through initial part of consolidation zone 710.

Figure 3A:
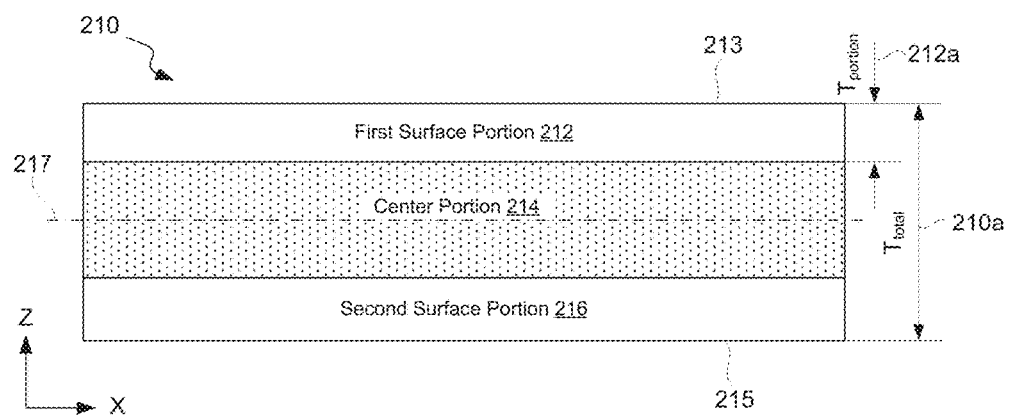
FIG. 3A is a schematic cross-sectional representation of a laminated sheet formed from the layup shown in FIG. 2A, in accordance with some embodiments.

Referring to FIG. 3A, one example of laminated sheet 210 is shown this figure. Thickness 210a of laminated sheet 210 (shown as $T_{total}$ in FIG. 3A) extends between two surfaces 213 and 215 of that sheet. In some embodiments, the thickness of laminated sheet 210 ($T_{total}$) is less than about 0.060 inches or, more specifically, less than about 0.050 inches or even less than about 0.040 inches. It should be noted that the thickness of laminated sheet 210 ($T_{total}$) determines the cross-section of composite feedstock strips 220 as further described below with reference to FIG. 4B. Also shown in FIG. 3A is center plane 217 of laminated sheet 210 positioned at equal distances between two surfaces 213 and 215 of that sheet.

In some embodiments, the volumetric fraction of fibers 206 within laminated sheet 210 varies throughout the thickness of laminated sheet 210. For purposes of this document, a volumetric fraction is defined as a ratio of the volume of one component (e.g., fibers 206) to the overall volume of the structure containing this component. When the volumetric fraction is discussed with a reference to the cross-section of a structure, the volumetric fraction may be presented as a ratio of cross-sectional areas (i.e., a ratio of the cross-sectional area of the component in question to the overall cross-sectional of the entire structure). The variability of the volumetric fraction of fibers 206 within laminated sheet 210 may be attributed to the arrangement of one or more fiber containing plies 204 and one or more of resin plies 202 in layup 210 as well as composition of each ply.

The example of laminated sheet 210 presented in FIG. 3A includes two surface portions 212 and 216. Specifically, surface portion 212 forms first surface 213 of laminated sheet 210, while surface portion 216 forms second surface 215. Both portions 212 and 216 may be substantially free from fibers 206. Center portion 214 may include all fibers 206 of laminated sheet 210. For clarity, center portion 214 is disposed between two surface portions 212 and 216. This is an example of concentrating fibers 206 around center plane 217 of laminated sheet 210. This type of distribution may be achieved by forming surface portions 212 and 216 from resin plies 202 only. In this example, resins plies 202 are free from fibers. At the same time, center portion 214 may be formed from various one or more fiber containing plies 204. In some embodiments, one or more resin plies 202 may be also used to form center portion. Referring to the example of layup 200 shown in FIG. 2A, first surface portion 212 may be formed from resin plies 202a and 202b, while second surface portion 216 may be formed from resin plies 202e and 202f. Center portion 214 may be formed from fiber containing plies 204a-204d as well as resin plies 202c and 202*d*. This arrangement and number of fiber containing plies 204 and resin plies 202 is selected to achieve a desired thickness of center portion 214 as well as distribution of fibers within center portion 214 and laminated sheet 210 overall.

Referring to FIG. 3A, a ratio of thickness 212*a* of surface portion 212, which may be free from fibers 206, to total thickness 210*a* of laminated sheet 210 ($T_{portion}/T_{total}$) may be between about 5% and 45% or, more specifically, between about between about 10% and 30%. This fiber-free portion 212 allows changing the cross-sectional profile of composite feedstock strips 220 without disturbing fibers 206 as further described below with reference to FIGS. 5B-5C.

Figure 8:
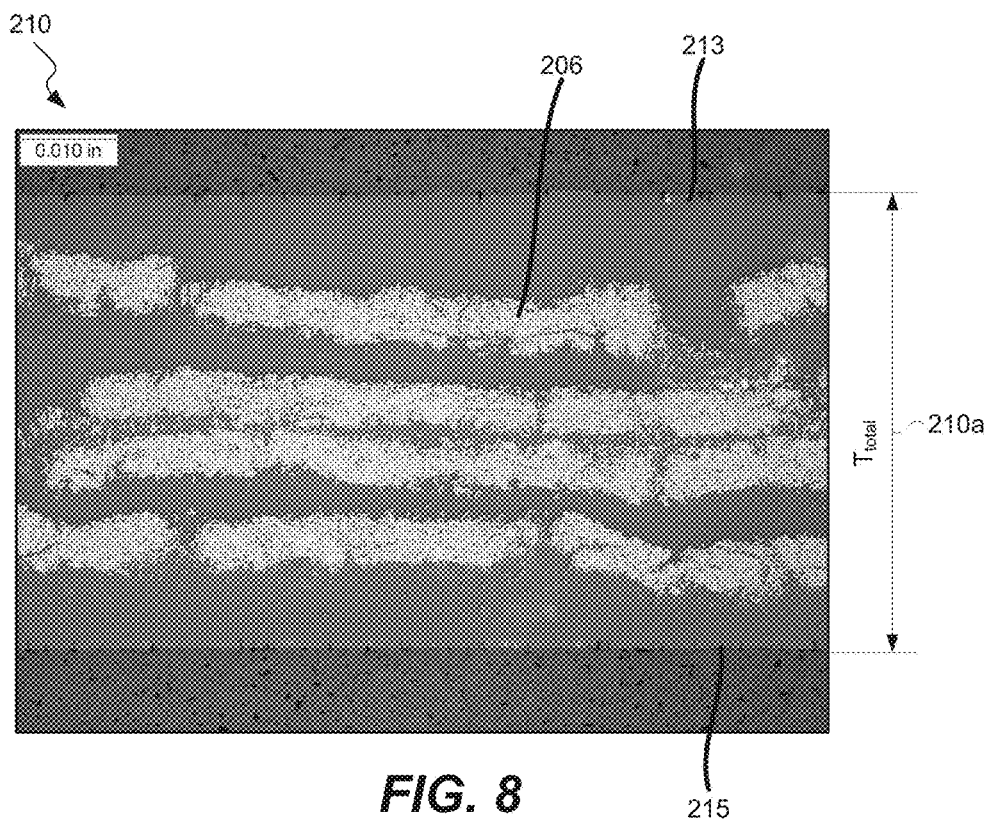
FIG. 8 is a photo of a cross-section of a composite feedstock strip used in a test.

FIG. 8 illustrates a cross-sectional image of a test laminate sheet (having ply arrangements similar to the example shown in FIG. 2A and described above). This cross-sectional image of FIG. 8 illustrates an actual distribution of fibers throughout the cross-section of the test sample. Specifically, this test laminate sheet was prepared using the following layup: two PES plies/carbon-PEKK ply/PES ply/two carbon-PEKK plies/PES ply/carbon-PEKK ply/two PES plies. The carbon-PEKK plies included above 60% of carbon fibers and each had a thickness of about 0.0055 inches. The PES plies were each 0.005 inches in thickness. The horizontal white patches are cross-sections of fibers 206 provided by in the carbon-PEKK plies. There are four distinct groupings of these white horizontal patches, each grouping corresponding to a separate carbon-PEKK ply. The patches are clearly positioned away from surfaces 213 and 215 of this test laminate sheet corresponding to the model presented in FIG. 3A and described above.

Figure 3B:
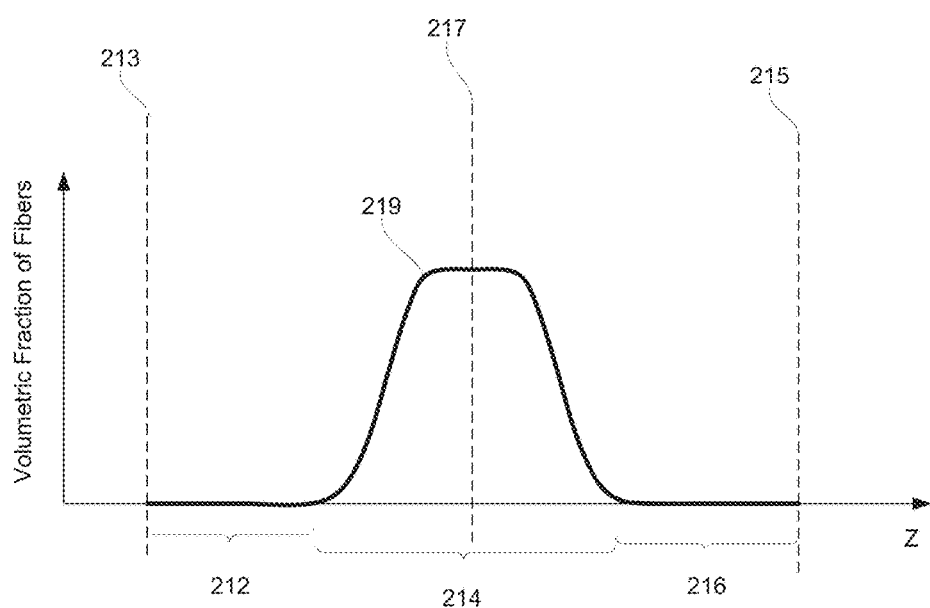
FIG. 3B is a schematic plot showing volumetric fraction of fibers as a function of location along the thickness of a laminated sheet, in accordance with some embodiments.

Referring to FIGS. 3A-B and FIG. 8, the volumetric fraction of fibers 206 within laminated sheet 210 is greater at center plane 217 of laminated sheet 210 than at one or both surfaces 213 and 215. Specifically, FIG. 3B illustrates one example of volumetric fraction profile 219 based on the location along the thickness direction (the Z axis). This figure identifies surface portions 212 and 216, being free from fibers, and center portion 214, containing all fibers 206. Since surface portions 212 and 216 and free from fibers, the volumetric fraction in these portions is at a zero level. In some embodiments, volumetric fraction profile 219 is symmetric with respect to center plane 217 of laminated sheet 210 as, for example, shown in FIG. 3B. This symmetric profile may be achieved by a symmetric position of plies in layup 200, such as in the example illustrated in FIG. 2A.

In some embodiments, the average of volumetric fraction of fibers 206 within entire laminated sheet 210 is between about 1% and 60% on average or, more specifically, between about 10% and 50% or even between about 20% and 40%. This characteristic may be also referred to as a total fiber loading. However, unlike most of conventional composite materials, laminated sheet 210 has uneven distribution of fibers 206.

Returning to FIG. 1, method 100 may continue with slitting laminated sheet 210 into composite feedstock strips 220 during operation 120. During this operation laminated sheet 210 is turned into composite feedstock strips 220. Slitting may be performed using one of waterjet slitting, rotational cutting, pressure wheel slitting, or roll slitting. Furthermore, slitting the laminated sheet 210 into the composite feedstock strips 220 is performed in a roll-to-roll process.

Figures 4B, 4C:
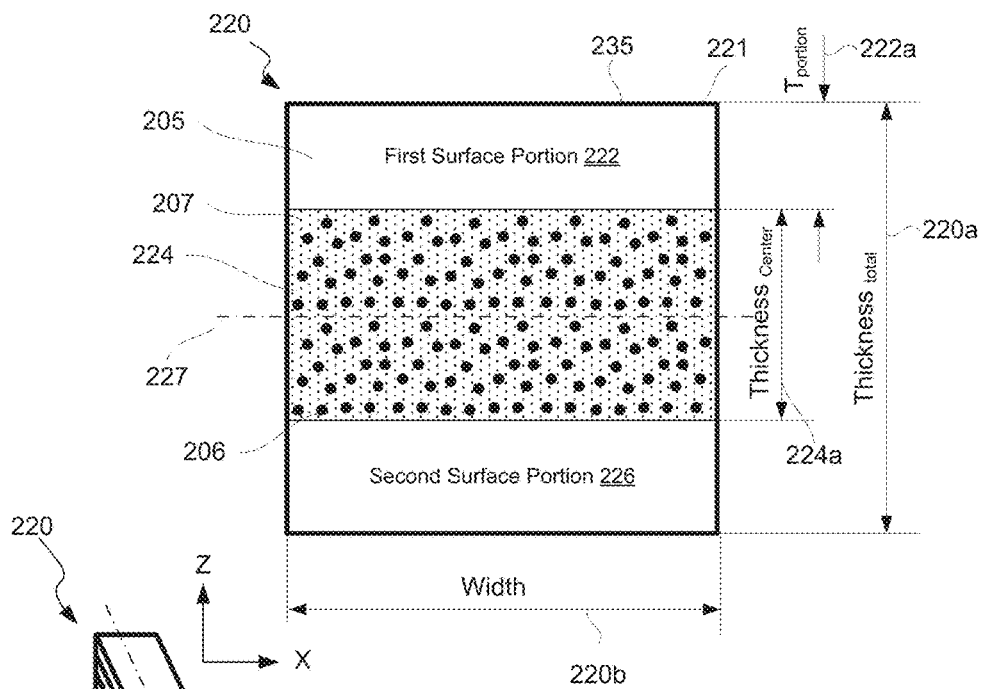
FIG. 4B is a schematic cross-sectional representation of a composite feedstock strip, in accordance with some embodiments.
FIG. 4C is a schematic perspective representation of the composite feedstock strip shown in FIG. 4B, in accordance with some embodiments.

Referring to FIGS. 3C and 4A, slitting may be performed along direction 230 parallel to all fibers 206 with laminated sheet 210. As such, slitting does not disturb the continuity of fibers 206, i.e., does not cut fibers. Cross-sectional profile 221 of each of composite feedstock strips 220 formed during operation 120 may be a square as, for example, shown in FIGS. 4A-4C. More generally, cross-sectional profile 221 may be a rectangle. This type of profile 221 is a result of slitting in the direction substantially perpendicular to surfaces 213 and 215 of laminated sheet 210. This square or rectangular profile may be later converted into a round profile, e.g., a circular profile or an oval profile.

Referring to FIGS. 4B and 4C, all fibers 206 in each composite feedstock strip 220 are parallel to primary axis 223 of that strip. For purposes of this document, primary axis 223 is defined as an axis extending along the longest dimension of composite feedstock strip 220, such as its length 220*c* as shown in FIG. 4C. As described above, all fibers 206 are parallel in laminated sheet 210 prior to its slitting. Furthermore, slitting is performed along the direction parallel to the fibers. As a result, all fibers 206 remain parallel (as defined above) to each other in composite feedstock strip 220 and extend parallel to primary axis 223 of the strip. This continuous and unidirectional orientation of fibers results in superior tensile strength and other mechanical characteristics of composite feedstock strip 220. For example, tensile strength of over 90 ksi have been measured in some representative test strips.

Figure 6A:
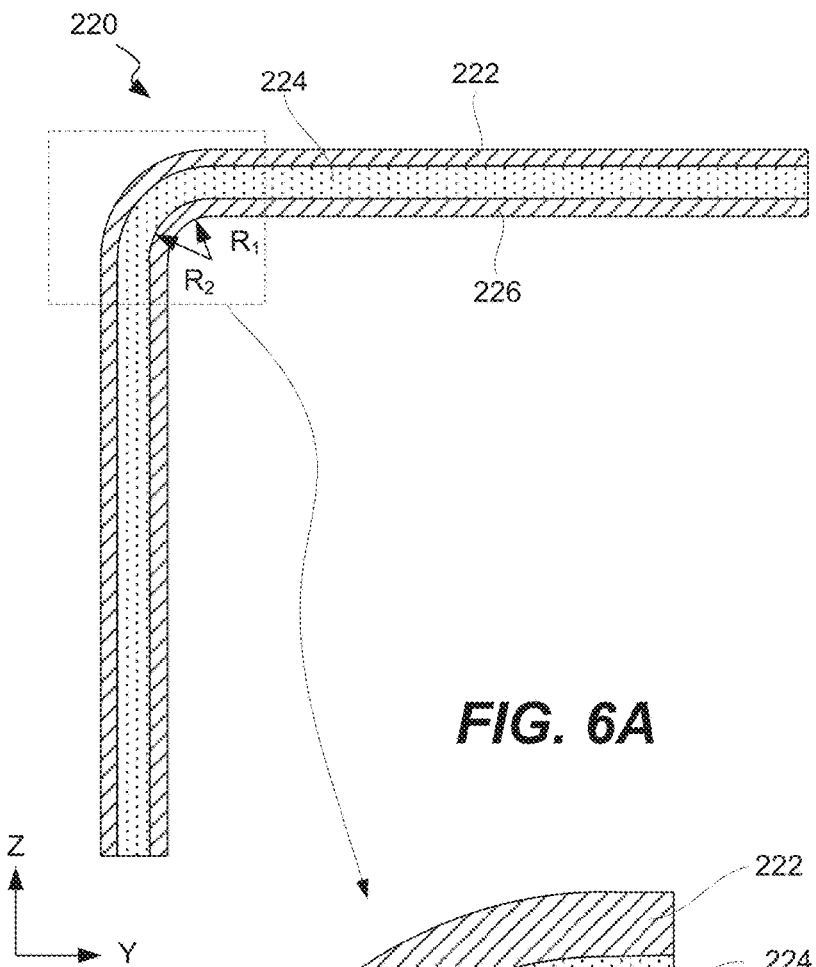
FIGS. 6A and 6B are schematic cross-sectional representations of a bent composite feedstock strip, in accordance with some embodiments.
Figure 6B:
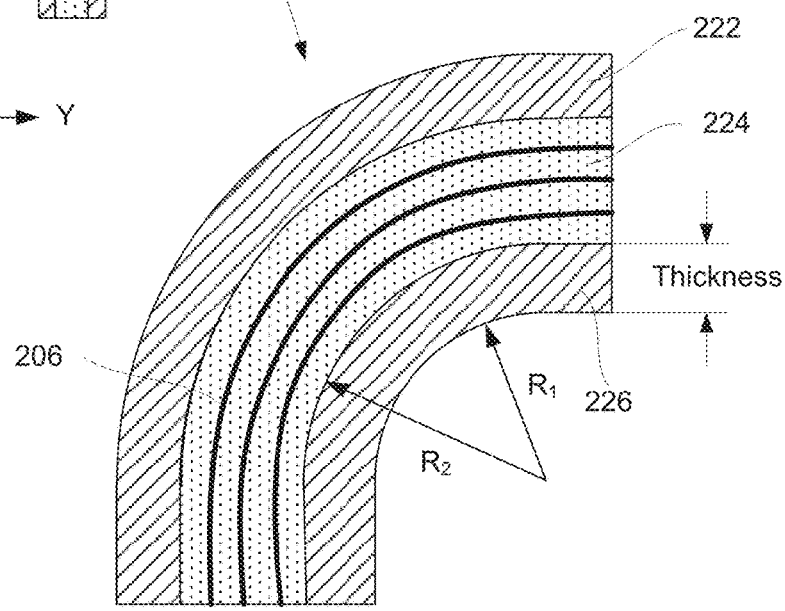

At the same time, composite feedstock strip 220 may be bendable in directions perpendicular to its primary axis 223. This bending capability is provided by the unidirectional orientation of fibers 206 and, in some embodiments, by uneven distribution of fibers 206 within composite feedstock strip 220. Specifically, FIGS. 6A and 6B illustrate a cross-section of strip bent 90°. Second surface portion 226 experiences a sharper bend radius ($R_1$) than the bend radius ($R_2$) of center portion 224. At the same time, surface portions 226 may be free from fibers 206 and, as a result, may be more malleable than center portion 204. The fiber distribution allows composite feedstock strip 220 to be coiled in small diameter packages for storage, shipment, and subsequent use in additive manufacturing.

In some embodiments, fibers 206 may have an average length of at least 100 feet or even at least about 1000 feet in composite feedstock strips 220. This reflects the continuity aspect of fibers in composite feedstock strips 220. At the same time, the principal cross-sectional dimension 220*d* of composite feedstock strips 220 after reforming, as for example shown in FIG. 5C, may be less than about 0.060 inches or, more specifically, less than about 0.050 inches or even less than about 0.040 inches. This small cross-sectional dimension 220*d* may be needed for additive manufacturing. If the cross-sectional profile of composite feedstock strip 220 is a circle, then its principal cross-sectional dimension 220*d* is the diameter of the circle as shown in FIG. 5C. However, if the cross-sectional profile of composite feedstock strip 220 is a square, then its principal cross-sectional dimensions are width 220*b* and thickness 220*a*, which are the same as shown in FIG. 4B.

Returning to FIG. 1, method 100 may involve changing the cross-sectional profile of each composite feedstock strip during optional operation 130. For example, the cross-sectional profile of each composite feedstock strip may be changed from being a square (after slitting of the laminated sheet) to a circle or a hexagon. Currently, the nozzles used for additive manufacturing have round profiles to help with directional changes while applying materials. As such, having round or similar (close to being round) cross-sectional profile of composite feedstock strips 220 may help during additive manufacturing. However, additive manufacturing techniques may be developed to use other feedstock strips with other types of cross-sectional profiles. The current methods allow forming many different types of profiles without disturbing orientation of continuous fibers or their continuity.

Operation 130 may involve heating 132 composite feedstock strip 220 and redistributing 134 material 229 away from corners 228 of cross-sectional profile 221a as shown in FIGS. 5B and 5C. Specifically, FIG. 5B illustrates composite feedstock strip 220 disposed within form 510. The cross-sectional profile of form 510 may be round. However, the diameter of form 510 at this location (identified as A-A and referring to FIG. 5A) is greater than the diameter of final cross-sectional profile 221b identified with a dash line in FIG. 5B. At this location, corners 228 of composite feedstock strip 220 contact form 510. It should be noted that corners 228 extend outside of the boundary of final cross-sectional profile 221b and any such outside material will be brought within the boundaries (e.g., by filling voids) during operation 130. In some embodiments, material 229 redistributed away from the corners 228 is free from fibers 206.

This redistribution of the outside material during operation 130 may be performed without substantial impact on the material that is within the boundary of final cross-sectional profile 221b. Specifically, the position of continuous fibers 206 within composite feedstock strip 220 is retained during operation 130 as, for example, illustrated with FIGS. 5B and 5C showing static cross-sectional profile of center portion 224 of composite feedstock strip 220. This may be achieved by selective heating of corners 228 of composite feedstock strip 220 attributable to the direct contact of corners 228 with heated form 510. The remaining portion of composite feedstock strip 220 may be heated less than corners due to the heat insulating nature of the materials forming composite feedstock strip 220 and speed with which operation 130 is performed. Specifically, during operation 130, center portion 224 comprising continuous fibers 206 may have a lower temperature than material 229 being redistributed away from corners 228. As noted above, material 229 may be free from continuous fibers 206.

Changing cross-sectional profile operation 130 may be performed using liquefier 500, one example of which is shown in FIG. 5A. Liquefier 500 may include form 510 with a tapered cross-sectional profile and heater 512 for heating form 510. Because continuous fibers 206 of composite feedstock strip 220 are unidirectional and continuous, composite feedstock strip 220 can be easily fed through liquefier 500 without clogging it (which is a common problem with chopped continuous fibers and particles used as structural supports in composites). Furthermore, composite feedstock strip 220 may substantially retain its tensile strength while being fed through liquefier 500 again due to the continuous nature of continuous fibers 206, which simplifies handling composite feedstock strip 220 during operation 130.

In some embodiments, operation 130 is not performed. Composite feedstock strips 220 having a rectangular or a square profile may be used for subsequent processing. Method 100 may also involve performing 140 additive manufacturing using composite feedstock strips 220.

Examples of Aircraft and Methods of Fabricating and Operation Aircraft

The illustrated embodiments provide a novel fabrication method of forming composite feedstock strips with continuous unidirectional orientations of continuous fibers and tailored distribution of these continuous fibers throughout the cross-section of the strips. Furthermore, these methods provide for different cross-sectional profiles and/or dimensions of the strips. Continuous processing used in these methods not only increases processing throughput but also provides high level of control of various characteristics of the composite feedstock strips. The embodiments find applicable uses in a wide variety of potential applications, including, for example, in the aerospace industry. The disclosed method is ideally suited for additive manufacturing of parts having complex geometries, such as brackets, clip supports, or more generally any irregular cross sections-structures, which are currently formed from metal (e.g., lugs, end fittings). The parts should be generally distinguished from parts having simple (e.g., linear) geometries such as beams (such as non-varying cross sections). The disclosed method is also suited for one-of-a-kind or very limited part runs with non-varying cross section, which could be fabricated using additive manufacturing.

Figure 9:
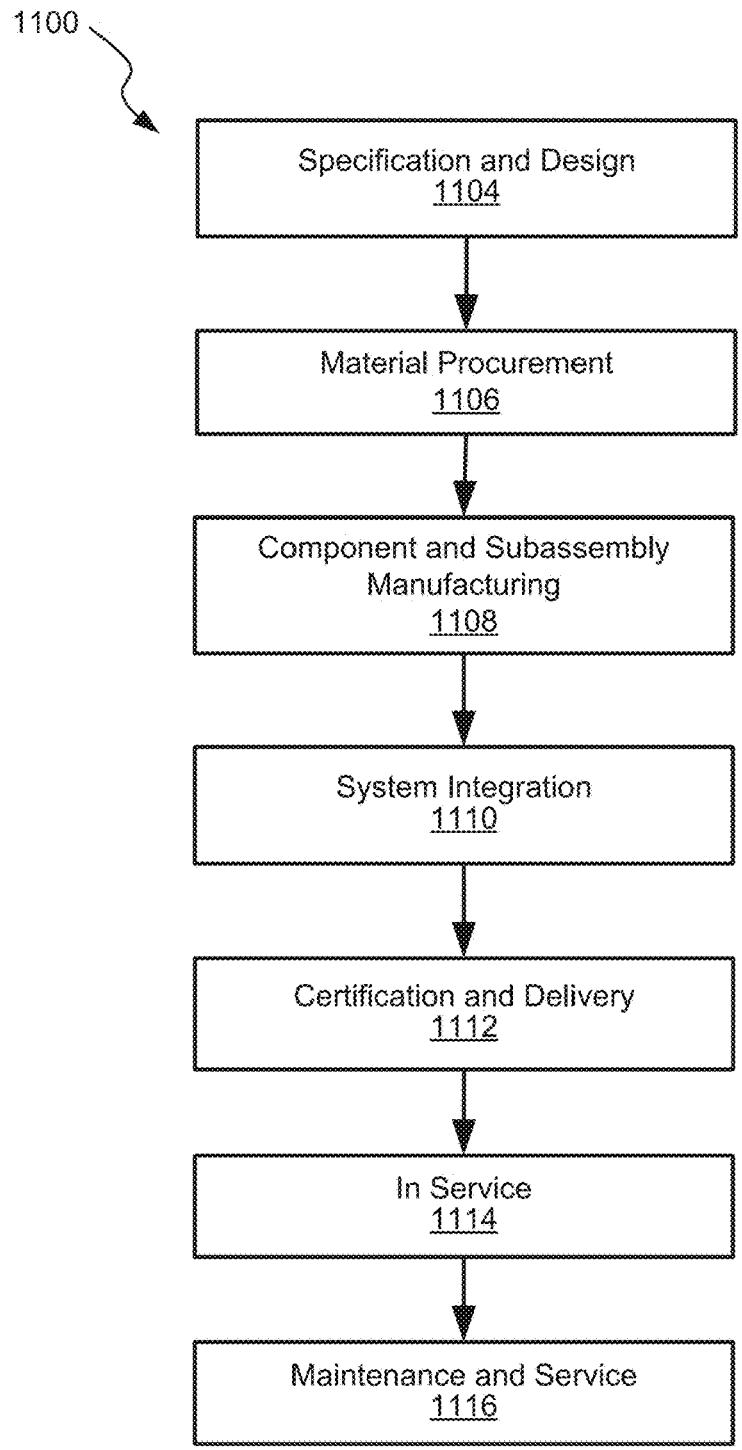
FIG. 9 is a block diagram of aircraft production and service methodology that may utilize end effectors described herein.
Figure 10:
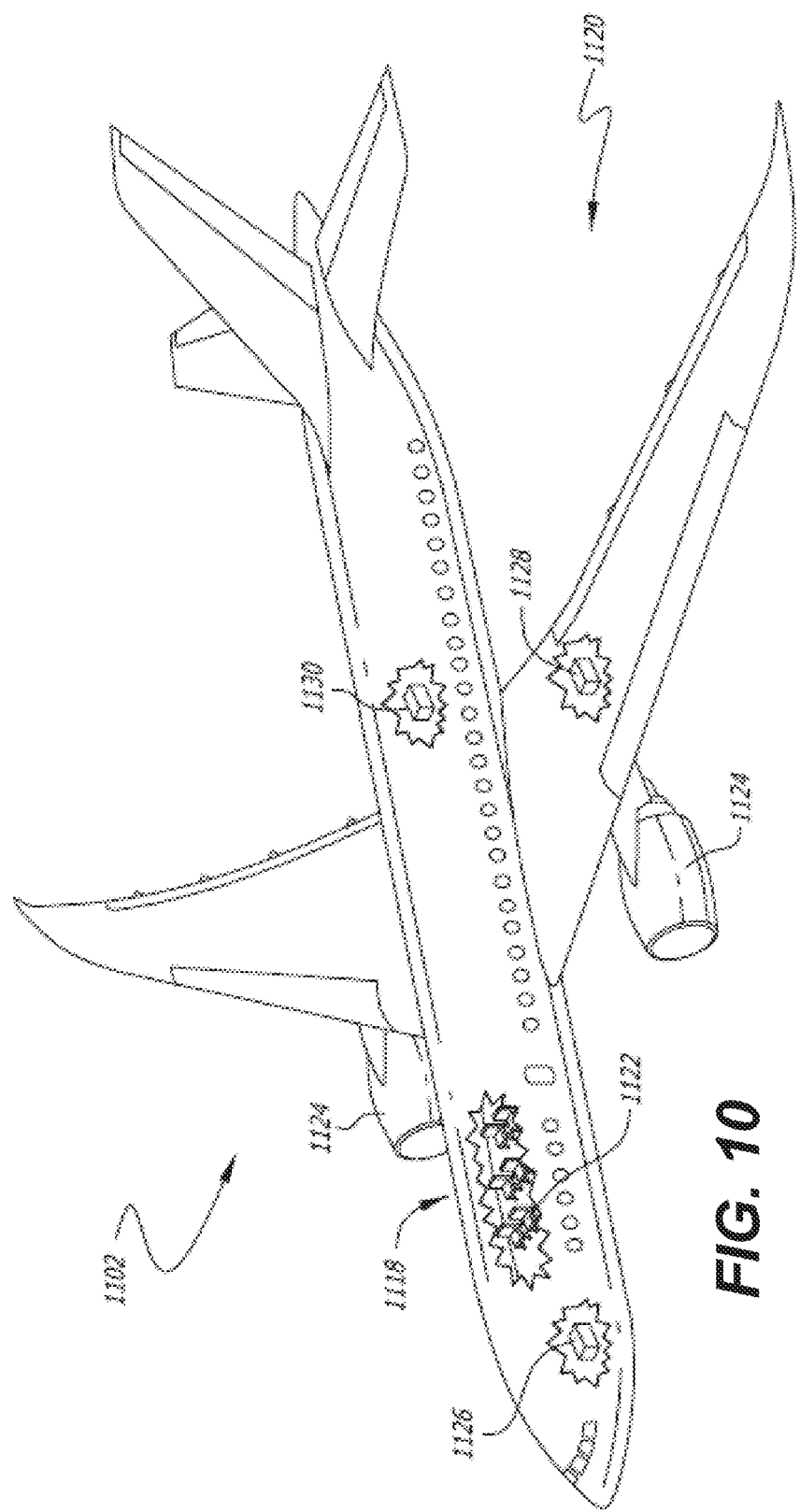
FIG. 10 is a schematic illustration of an aircraft that may include composite structures described herein.

Examples of the present disclosure may be described in the context of aircraft manufacturing and service method 1100 as shown in FIG. 9 and aircraft 1102 as shown in FIG. 10. During pre-production, method 1100 may include specification and design (block 1104) of aircraft 1102 and material procurement (block 1106). During production, component and subassembly manufacturing (block 1108) and system integration (block 1110) of aircraft 1102 may take place. Composite feedstock strips may be formed and used in additive manufacturing during one of these steps, e.g., specification and design (block 1104) of aircraft 1102, material procurement (block 1106), component and subassembly manufacturing (block 1108), and system integration (block 1110) of aircraft 1102. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108 and block 1110), for example, by substantially expediting assembly of or reducing the cost of aircraft 1102.

Similarly, one or more examples of the apparatus or method realizations, or a combination thereof, may be utilized, for example and without limitation, while aircraft 1102 is in service (block 1114) and/or during maintenance and service (block 1116).

Conclusion

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of forming composite feedstock strips for additive manufacturing, the method comprising:
   forming a layup, comprising one or more fiber containing plies and one or more of resin plies,
      all of continuous fibers in all of the one or more fiber containing plies, forming the layup, being parallel to each other,
      forming the layup comprises varying a volumetric fraction of the continuous fibers within the layup throughout a thickness of the layup;
   laminating the layup thereby forming a laminated sheet, a volumetric fraction of the continuous fibers within the laminated sheet being greater at a center of the laminated sheet along the thickness than at one of surfaces of the laminated sheet; and
   slitting the laminated sheet into the composite feedstock strips, slitting being performed along a direction parallel to all of the continuous fibers within the laminated sheet thereby preserving continuity of a majority of the continuous fibers along a full length of the composite feedstock strips.

2. The method of claim 1, wherein a portion of the laminated sheet forming the one of the surfaces of the laminated sheet is free from the continuous fibers.

3. The method of claim 1, wherein a cross-sectional profile of each of the composite feedstock strips is a square.

4. The method of claim 1, wherein all of continuous fibers in each of the composite feedstock strips are parallel to a primary axis of that composite feedstock strip.

5. The method of claim 1, further comprising changing a cross-sectional profile of each of the composite feedstock strips.

6. A method of forming composite feedstock strips for additive manufacturing, the method comprising:
   forming a layup, comprising one or more fiber containing plies and one or more of resin plies,
      all of continuous fibers in all of the one or more fiber containing plies, forming the layup, being parallel to each other;
   laminating the layup thereby forming a laminated sheet; and
   slitting the laminated sheet into the composite feedstock strips,
      slitting being performed along a direction parallel to all of the continuous fibers within the laminated sheet thereby preserving continuity of a majority of the continuous fibers along a full length of the composite feedstock strips; and
   changing a cross-sectional profile of each of the composite feedstock strips, wherein the cross-sectional profile of each of the composite feedstock strips is changed to a circle.

7. The method of claim 6, wherein changing the cross-sectional profile of each of the composite feedstock strips comprises heating each of the composite feedstock strips and redistributing a material away from corners of the cross-sectional profile.

8. The method of claim 7, wherein position of the continuous fibers within each of the composite feedstock strips is retained while redistributing the material away from the corners of the cross-sectional profile.

9. The method of claim 1, wherein at least one outer ply of the layup is one of the one or more resin plies.

10. The method of claim 1, wherein the one or more resin plies comprise one or more materials selected from the group consisting of polyethersulfone (PES), polyphenylsulfone (PPS), polyetheretherketone (PEEK), polyetherketoneketone (PEKK), polyetherimide (PEI), and thermoplastic polyimide (TPI).

11. The method of claim 1, wherein the one or more resin plies comprise polyethersulfone (PES).

12. The method of claim 1, wherein the one or more fiber containing plies comprise one or more materials selected from the group consisting of polyethersulfone (PES), polyphenylsulfone (PPS), polyetheretherketone (PEEK), polyetherketoneketone (PEKK), and polyetherimide (PEI).

13. A method of forming composite feedstock strips for additive manufacturing, the method comprising:
   forming a layup, comprising one or more fiber containing plies and one or more of resin plies,
      all of continuous fibers in all of the one or more fiber containing plies, forming the layup, being parallel to each other,
      the one or more fiber containing plies comprising polyetherketoneketone (PEKK);
   laminating the layup thereby forming a laminated sheet; and
   slitting the laminated sheet into the composite feedstock strips,
      slitting being performed along a direction parallel to all of the continuous fibers within the laminated sheet thereby preserving continuity of a majority of the continuous fibers along a full length of the composite feedstock strips.

14. The method of claim 1, wherein the composite feedstock strips have a principal cross-sectional dimension of less than about 0.050 inches.

15. The method of claim 1, wherein forming layup and laminating sheet is performed in a roll-to-roll process.

16. The method of claim 1, wherein slitting the laminated sheet into the composite feedstock strips is performed in a roll-to-roll process.

17. The method of claim 1, wherein the volumetric fraction of the continuous fibers within the laminated sheet is greater at the center of the laminated sheet than both surfaces of the laminated sheet.

18. The method of claim 17, wherein a profile of the volumetric fraction of the continuous fibers within the laminated sheet is symmetric with respect to the center of the laminated sheet.

* * * * *